July 15, 1924.
H. INGRAM
1,501,412
PRESSURE CONTROL SYSTEM FOR STERILIZING AND PROCESSING APPARATUS
Filed Feb. 24, 1923
3 Sheets-Sheet 1
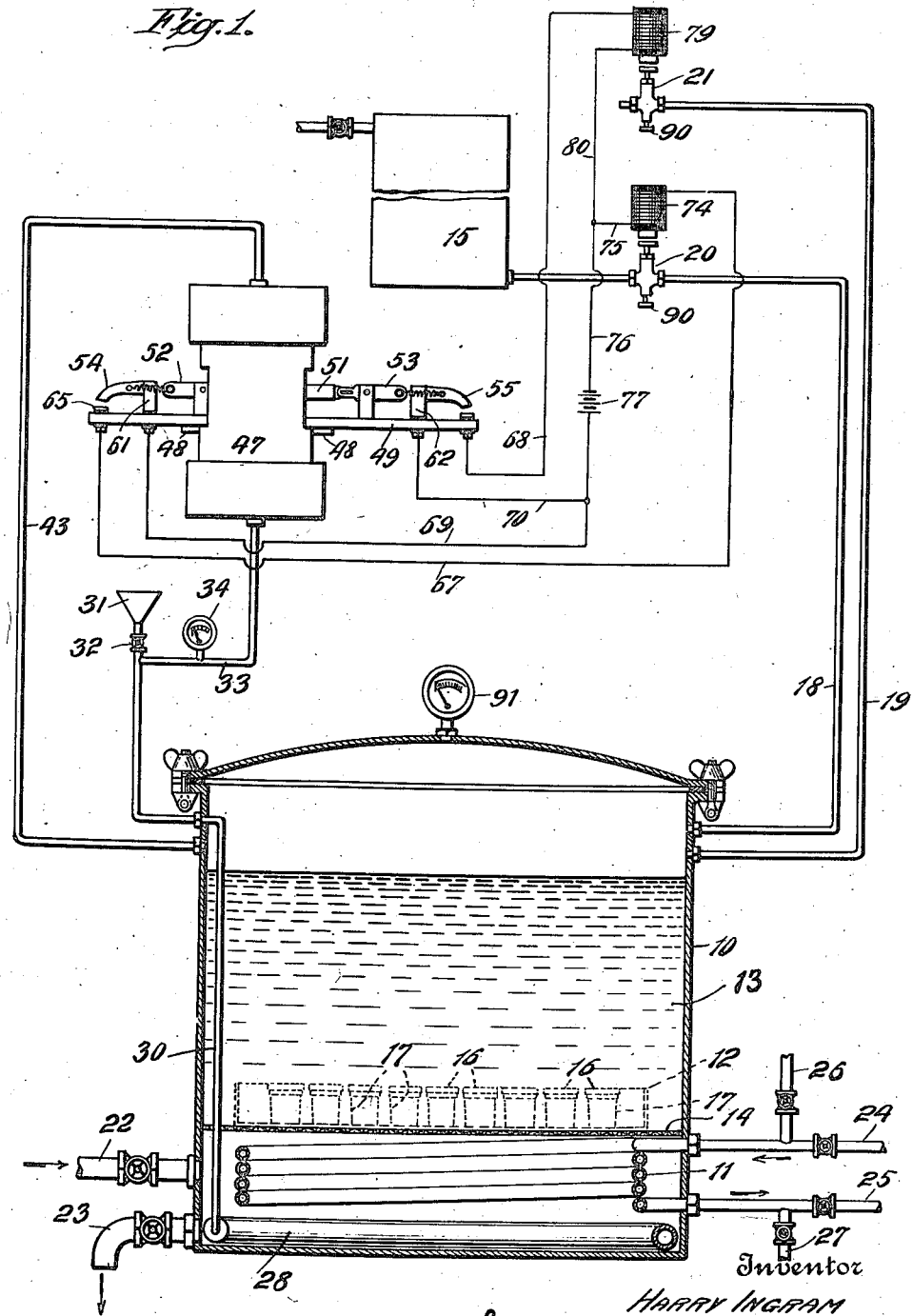

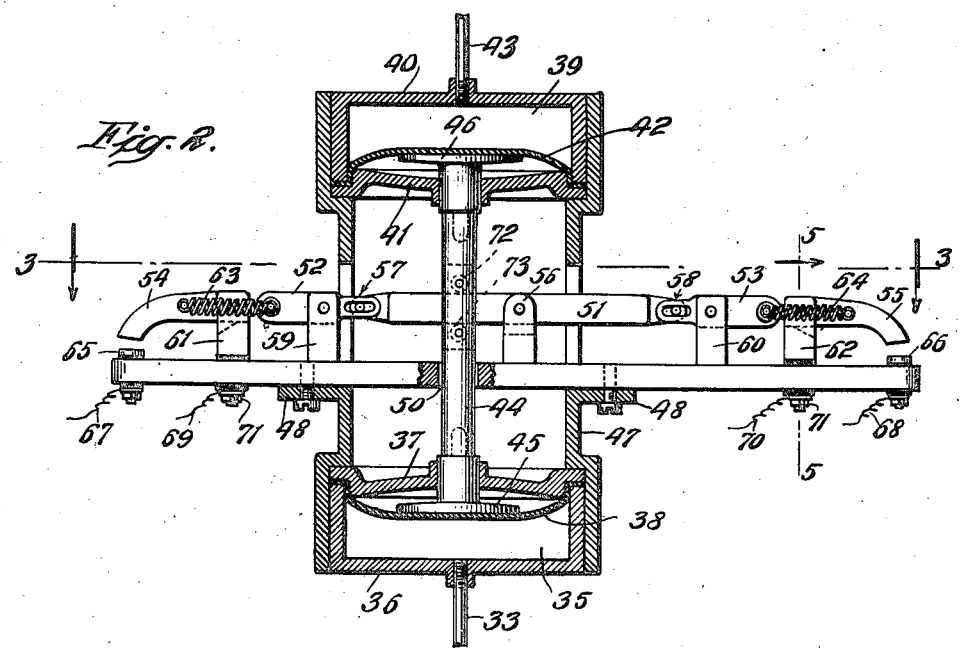
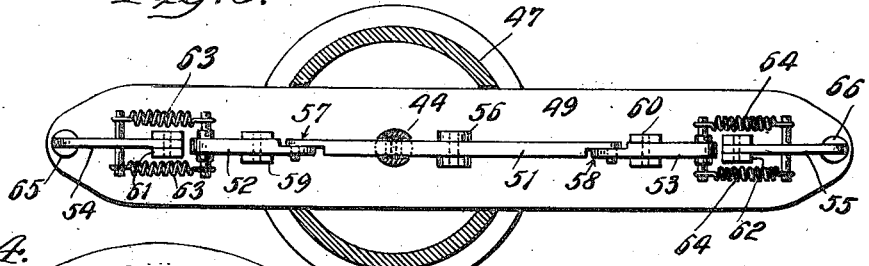
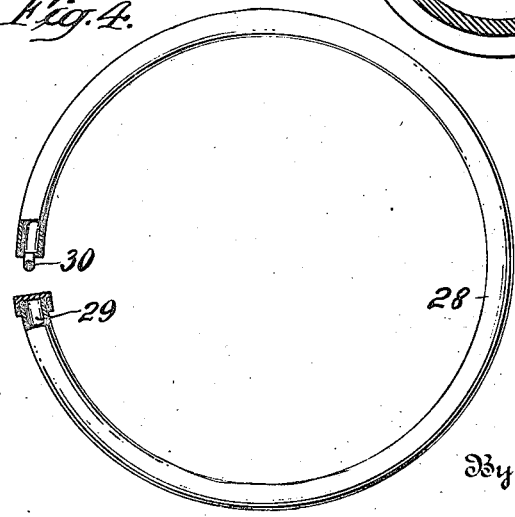
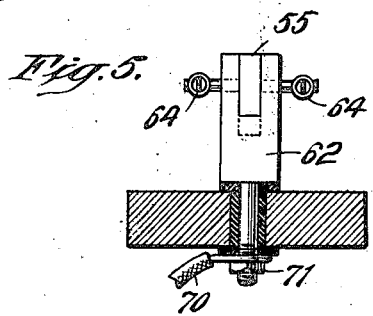

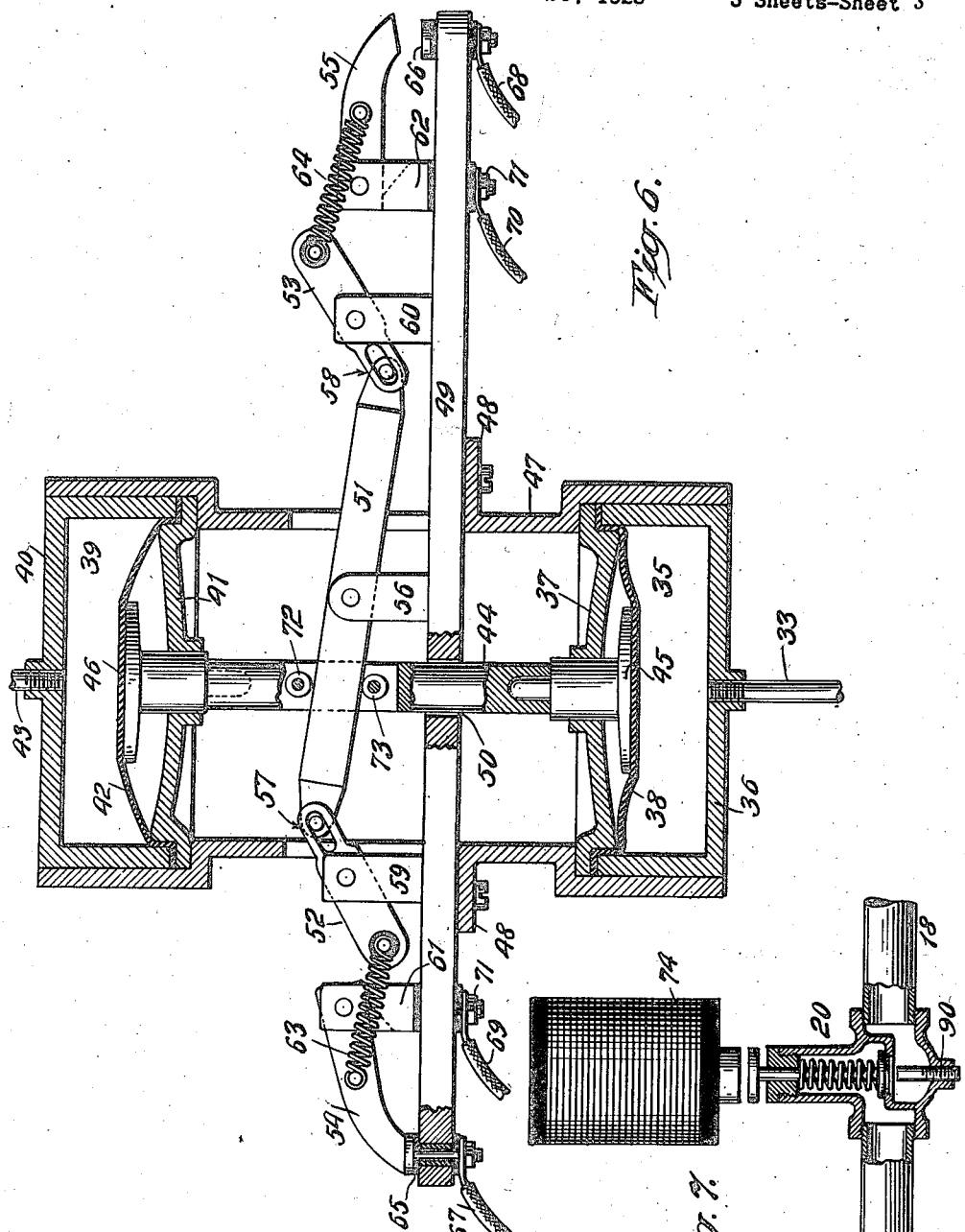

Patented July 15, 1924.

1,501,412

UNITED STATES PATENT OFFICE.

HARRY INGRAM, OF BROOKLYN, NEW YORK.

PRESSURE-CONTROL SYSTEM FOR STERILIZING AND PROCESSING APPARATUS.

Application filed February 24, 1923. Serial No. 620,871.

*To all whom it may concern:*

Be it known that I, HARRY INGRAM, a citizen of the United States, and resident of Brooklyn, in the county of Kings and State of New York, have invented certain new and useful Improvements in Pressure-Control Systems for Sterilizing and Processing Apparatus, of which the following is a specification.

This invention relates to apparatus for sterilizing or other heat processing food products and the like contained in closed receptacles, for example, tumblers, jars or the like, to which caps have been applied, preferably by vacuum sealing machines, and to that kind of apparatus in which the capped receptacles are immersed in water or other medium contained in a suitable tank or retort and subjected to the desired temperature, usually ranging from 240 degrees to 250 degrees F., and in which provision is made for supplying and for automatically regulating a pressure in the processing tank sufficient to overbalance the internal pressure generated within the receptacles, with intention to prevent such internal pressure from blowing off the caps.

In sterilizing apparatus of this kind, the automatic pressure regulating means heretofore proposed comprised as their essential element an auxiliary vessel or sample receptacle of the same volume and coefficient of expansion as and filled with material similar to the contents of the receptacles to be processed. This auxiliary vessel is immersed in the processing tank whereby the temperature changes cause expansions and contractions of the contents of the said vessel which are transmitted to a diaphragm cover thereon which controls the admission of the counter-pressure to and its release from the processing tank. Exact conformity between the specimen auxiliary vessel and the receptacles undergoing treatment does not however give conditions within the said vessel adequately representative of those within the receptacles, because of the frictional and other resistances of the control means. The expansions and contractions of the auxiliary vessel, having these resistances to overcome, are less than and lag behind those of the receptacles which are not subject to equivalent resistances, with the result that the caps thereof are liable to be blown off. Furthermore such exact conformity of the auxiliary vessel with the receptacles being processed prevents the maintenance of a pressure preponderance in the processing tank, because there must be a preponderance of pressure in the receptacles sufficient to bulge the caps thereof before any pressure regulation commences.

The present invention consists in the auxiliary tank employed as counter-pressure regulating means being independent of the treated receptacles as regards its characteristics which are pertinent to the process, viz, volume, shape, and contents, and adapted to give conditions within the auxiliary tank which are at all times adequately representative of those within the receptacles, and to ensure at all times a uniform preponderance of pressure in the processing tank, for preventing the caps being blown off, the quantity of liquid in the auxiliary tank being regulatable.

The modern tendency is to use caps of very thin material which take a comparatively slight hold on the rims of the receptacles and the machine of the present invention has been found to operate with entire satisfaction under these conditions.

The invention will be fully understood from the detailed description hereinafter presented, reference being had to the accompanying drawing, in which:

Fig. 1 is a diagrammatic view, partly in section and partly broken away, of a processing apparatus equipped with the pressure control features of my invention, all the parts being shown in neutral position;

Fig. 2 is a vertical section through a portion of the pressure control mechanism, the portion shown representing two diaphragms exposed to the opposing pressures in the processing tank and the auxiliary chamber therein representative of the pressure conditions within the tumblers or jars under treatment in said tank, and which diaphragms on differences arising in said opposing pressures respectively actuate switches or the like to effect an increase or decrease of the pressure within said tank, as may be necessary, to act against the caps on said tumblers or jars; Fig. 2 illustrates said switches in side elevation and all the parts in neutral position;

Fig. 3 is a horizontal section through the same taken on the dotted line 3—3 of Fig. 2;

Fig. 4 is a detached top view, partly in section, of a tube affording the auxiliary chamber I employ in the main processing tank representative of the pressure conditions existing within the tumblers or jars under treatment, variations in said connections being utilized to automatically effect an increase or decrease of the pressure, as may be required, within the processing tank to act against the caps on the tumblers or jars therein;

Fig. 5 is a vertical section through a portion of the apparatus taken on the dotted line 5—5 of Fig. 2;

Fig. 6 is a view substantially corresponding with Fig. 2 and showing the mechanism thereof on a larger scale and as having been operated from neutral position by an increase of pressure in said auxiliary chamber to admit an additional supply of pressure to the processing tank to act against the caps on the tumblers or jars therein, and Fig. 7 is a side elevation, partly in section and partly broken away, of one of the valves and its pipe connections, with an electro magnet for opening the valve when required.

In the drawings, 10 designates a sterilizing or processing tank or retort of ordinary type, 11 a steam coil therein for properly heating the water, and 12 a basket of jars or tumblers immersed within the water 13 and resting upon a screen or perforated plate 14, the features thus far identified being of any usual or suitable type.

15 designates a compressed air tank with the use of which suitable pressure is introduced into the upper end of the tank 10 for exerting the proper pressure on the caps 16 of the tumblers or containers 17 for preventing the internal pressure generated during the sterilizing or processing operations within the tumblers or containers 17, from blowing said caps off from the tumblers or containers. I connect the tank 15 with the tank 10 by means of a supply-pipe 18, and from the upper end of the tank 10 I lead a blow-off pipe 19, said pipes being respectively equipped with valves 20, 21 to control the passage through them.

The tank 10 is equipped with a supply pipe 22 for water and with a drain outlet pipe 23. The steam coil 11 is employed for heating the water 13 within the tank 10, and after the processing operation has continued a sufficient length of time said coil 11 is used for circulating cold water therein for cooling the water 13. The coil 11 has valved inlet and outlet connections 24, 25, respectively, for steam and valved cold water inlet and outlet connections 26, 27, respectively, for use when cold water is to be circulated through the coil 11.

Within the tank 10 I place a ring-shaped tube 28 affording an auxiliary chamber 29 for liquid and which is sealed at one end as shown in Fig. 4 and provided with a pipe connection 30 at its other end. I recommend the ring-shaped tube 28 as one means for providing the auxiliary chamber 29, because said tube occupies a minimum of space within the lower end of the tank 10. The tube 28 however forms an auxiliary tank and may be of any convenient shape adapted to the conditions to be met in processing tanks. The auxiliary tank represented by the tube 28 is one of the important features of the invention, and the chamber 29 within this auxiliary tank is, in use, representative of the chambers within the tumblers or other containers 17, said auxiliary chamber 29 being utilized in connection with the other features of the apparatus as a governor or controller for regulating the pressure within the tank 10 so that at all times said pressure shall preponderate to the extent of three or four pounds, for instance, over the pressure generated by the processing operation within the tumblers 17, this preponderance of pressure serving to prevent the pressure within the tumblers from blowing off the caps 16. When the temperature of the water 13 is such that the internal pressure within the tumblers 17 increases, a similar increase of pressure will take place in the auxiliary chamber 29 and this increase of pressure in said chamber acts through the mechanism hereinafter to be described, to open the valve 20 in the pipe line 18 for the purpose of admitting an additional supply of pressure from the tank 15 into the upper end of the tank 10, thereby increasing the pressure in the tank 10 in proportion as the pressure increases within the tumblers 17. Upon a decrease of pressure in the tumblers 17 due to a decrease of temperature in the water 13, the pressure in the auxiliary chamber 29 likewise decreases and permits through the mechanism hereinafter described, the closing of the valve 20 in the pipe line 18, thus cutting off the supply of pressure from the compressed air tank 15 to the tank 10. There is a constant automatic balancing of pressures effected from the auxiliary chamber 29 between the internal conditions of the tumblers 17 and the tank 10.

The pipe 30 leading from the chamber 29 of the auxiliary tank 28, of whatever form said auxiliary tank may take, is provided with a filling funnel 31 and valve 32, said valve being provided to open the pipe 30 to the funnel 31 or cut off said funnel from the pipe, as may be desired. The pipe 30 has a branch pipe 33 equipped with a pressure gage 34 and leading through the lower end of a frame affording a pressure chamber 35, said frame being formed of a cup member 36 and a cap member 37 between the edges of which members the edges of a diaphragm 38 are securely held. Centrally above the diaphragm chamber 35 is a corresponding inverted diaphragm chamber 39 formed within an inverted cup member 40 and a lower cap member 41, between the edges of which members the edges of a diaphragm 42 are securely held. From the diaphragm chamber 39 a pipe 43 leads to the upper end of the tank 10. A reciprocatory rod 44 carries a lower head 45 between the diaphragm 38 and cap 37 and an upper corresponding head 46 between the diaphragm 42 and cap 41. The diaphragm 38 is exposed to the pressure within the auxiliary tank 28, the chamber 35 holding said diaphragm being connected by the piping 33, 30 with said auxiliary tank, and the diaphragm 42 is exposed to the pressure within the upper end of the tank 10, said tank 10 being connected by the pipe 43 with the chamber 39 containing said diaphragm 42. The rod 44, heads 45, 46 and diaphragms 38, 42 are moved upwardly by an increase of pressure within the auxiliary tank 28, representing the internal pressure conditions of the tumblers 17, and this movement is for the purpose, through switch mechanism presently to be described, of admitting an increased pressure from the tank 15 into the upper end of the tank 10. When the increase-pressure in the auxiliary tank 28 has diminished and thus relieved the lower diaphragm 38, the pressure in the upper end of the tank 10 will act against the diaphragm 42 to restore the rod 44 and switch devices operated therefrom to their normal or neutral condition shown in Figs. 1 and 2. An abnormal pressure in the tank 10, will act against the diaphragm 42 and rod 44 to open the blow-off pipe 19, which will relieve the tank of such pressure, as hereinafter explained.

The parts forming the diaphragm chambers 35, 39 are supported by a cylindrical casing or frame 47 which is slotted transversely and supports on lugs 48 a switch-supporting bar 49, this bar having a hole 50 through it through which the rod 44 may freely slide. The switch devices mounted over the bar 49 comprise a pivoted lever 51, pivoted links 52, 53, respectively, and pivoted switch arms 54, 55, respectively. The lever 51 is pivotally mounted in the upper end of a standard 56 supported by the bar 49, and the links 52, 53 have a pin and slot connection 57, 58, respectively, with the ends of the lever 51, the link 52 being pivotally mounted in the upper end of a standard 59 and the link 53 being likewise mounted in the upper end of a standard or post 60. The switch members 54, 55 are pivotally mounted in the upper ends of posts or standards 61, 62, respectively, and are connected by springs 63, 64, respectively, with the outer ends of the respective links 52, 53, said springs 63, 64 being normally in line with the pivot points of the switches 54, 55 and normally holding said switches free of their respective contacts 65, 66, respectively, which are insulated from the bar 49 and have binding screws on their lower ends receiving the conductors 67, 68, respectively. The lower ends of the standards or posts 61, 62 are insulated from the bar 49 and have stems extending through said bar to receive the upper ends of the conductors 69, 70, respectively, which are held in place by nuts 71 threaded upon the stems of said standards 61, 62, as shown in Fig. 5.

The main lever 51 of the switch mechanism extends between rollers 72, 73 carried within a slot in the rod 44 as clearly shown in Fig. 6. When the rod 44 is moved upwardly by an increase in pressure in the diaphragm chamber 35 it tilts the left hand end, looking at Figs. 2 and 6, of the lever 51 upwardly, as shown in Fig. 6, and the right hand end of said lever downwardly, and this movement of the lever 51 rocks the links 52, 53 on their pivots, turning the outer end of the link 52 downwardly and the outer end of the link 53 upwardly, as shown in Fig. 6, and this results in the link 52 acting through the springs 63 to clamp the switch 54 downwardly against the contact 65 and in the link 53 pulling on the springs 54 to maintain the switch 55 clear of its contact 66. The contact made between the switch arm 54 and contact 65 results in the making of a circuit through the conductor 67, electro-magnet 74, conductor 75, conductor 76, battery 77, conductor 69 and post 61 to the switch arm 54 and contact 65. The formation of this circuit results in the electro-magnet 74 becoming energized and opening the valve 20 in the pipe line 18 to permit additional pressure to flow from the compressed air tank 15 through said pipe line into the upper end of the tank 10, whereby to overbalance the increase of pressure indicated in the tumblers or containers 17 by the increase of pressure in the diaphragm chamber 35. In the condition of the apparatus shown in Fig. 6, the pressure within the tumblers or containers 17 and auxiliary tank 28 has risen and an additional supply of pressure in the upper end of the tank 10 is required to overbalance the same, and this additional supply of pressure passes from the compressed air tank 15 into the tank 10 due to the fact that the valve 20 has been opened automatically by such increase in pressure in the auxiliary tank 28. When the pressure in the tumblers 17 and auxiliary tank 28 decreases or when the pressure in the upper end of the tank 10 has increased sufficiently to overbalance the pressure in the auxiliary tank 28, such increase of pressure as may have passed into the upper end of the tank 10 will flow through the pipe 43 into the upper diaphragm chamber 39 and force the diaphragm 42, rod 44 and diaphragm 38 downwardly to their normal neutral position, and this movement of the rod 44 acts against the lever 51 to restore said lever and the links 52, 53 to their normal position, the return of the link 53 to its normal position operating through the springs 63 to quickly lift the switch arm 54 from its contact 65, thus breaking the circuit. When an undue excess of pressure enters the tank 10, such pressure passing through the pipe 43 and acting against the diaphragm 42 will drive the rod 44 and diaphragm 38 downwardly beyond their normal position or to the reverse of the condition shown in Fig. 6, and this will cause the rod 44 to move the left hand end of the lever 51 downwardly and in causing the right hand end of said lever to turn upwardly, this resulting in the link 53 being turned downwardly at its outer end and in acting through the springs 64 to close the outer end of the switch arm 55 against its contact 66, the outer end of the link 52 at such time turning upwardly and holding the switch arm 54 clear of the contact 65. The closing down of the switch arm 55 against its contact 66, completes a circuit through the conductor 68, electromagnet 79, conductor 80, conductor 76, battery 77 and conductor 70 to the post or standard 62 and thence through the switch arm 55 to its contact 66, the formation of this circuit serving to energize the magnet 79 and cause the same to open the valve 21 for the purpose of permitting the excess pressure in the upper end of the tank 70 to blow off through the pipe 19. Under normal conditions the switch mechanism will be in the condition shown in Figs. 1 and 2, and under an increase of pressure within the tumblers or containers 17 and auxiliary tank 28, the rod 44 will be moved upwardly and form a circuit, as shown in Fig. 6, serving to admit additional pressure from the compressed air tank 15 to the tank 10. When the conditions have become properly balanced, the rod 44 will be lowered and restore the switch mechanism to the condition shown in Figs. 1 and 2, and when excess pressure occurs in the upper end of the tank 10, the rod 44 will be moved downwardly and complete its circuit through the electromagnet 79 which will open the valve 21 to permit such excess to blow off through the pipe 19.

I have hereinbefore described the most satisfactory construction embodying my invention at this time known to me, but I do not limit my invention to all of the details of form and construction described, since I am aware that these details may be variously modified without departure from my invention and within the scope of the appended claims. I prefer to use water as the medium in the auxiliary tank 28, but mercury or other fluid responsive to heat may be made use of instead of water. It is entirely convenient, however, to employ water within the auxiliary tank 28, and I recommend its use. The quantity of water placed in the tank 28 will govern its action and consequently control the amount of pressure in the upper portion of the tank or retort 10. The pressure in the tank or retort 10 should always overbalance the internal pressure within the tumblers or jars 17, and the amount of the preponderance of pressure in the tank or retort 10 may be governed by a more or less quantity of water placed within the auxiliary tank 28.

I have described switches and electro-magnets for opening the valves 20, 21 when necessary, but I do not limit the invention to the use of the electric current for operating the valves 20, 21, since they are self-closing valves as shown in Fig. 7 and may be opened by other means, actuated by the pressure in the auxiliary tank 28, than the electric current. As, for illustration, they may be operated by compressed air. I preferably equip the valves 20, 21 with manually operative stems 90 for opening the valves 20, 21 in the event that the electric current should fail.

The tank or retort 10 is equipped with a pressure gage 91 to indicate the pressure therein and the pipe 33 is equipped with a pressure gage 34 to indicate the pressure in the auxiliary tank 28, and by observing these gages the operator may at all times know the pressures existing in the retort and in the auxiliary tank 28 and may see to it that the pressure in the tank or retort 10 overbalances the pressure in the auxiliary tank 28.

The auxiliary tank 28 and its pipe connections 30, 33 leading to the diaphragm chamber 35 provide a sealed chamber and this chamber is representative of the pressure conditions existing in the sealed tumblers 17 and constitutes one of the more important features of the invention.

I show the coil 11 as means for heating the water 13 in the retort 10, but it is not unusual in this art to heat the water by injecting steam directly into the same and hence the coil 11 is not to be regarded as a feature of limitation.

What I claim as my invention and desire to secure by Letters-Patent, is—

1. In apparatus of the character described comprising a main tank or retort within which products contained in capped tumblers and the like are subjected to high temperatures, a compressed air tank connected by a pipe containing a valve with said retort for providing the necessary external pressure against the caps on said tumblers, an auxiliary tank within the retort containing a fluid and representative of the pressure conditions within the tumblers, opposing diaphragms respectively exposed to the pressure within said auxiliary tank and the pressure in said retort, a blow-off valve connected with said retort, and electrical means operable from said diaphragms for opening the compressed air valve to admit pressure to the retort in excess of the pressure generated within the tumblers and for opening said blow-off valve to relieve the retort of undue excess pressure therein.

2. In apparatus of the character described comprising a main tank or retort within which products contained in capped tumblers and the like are subjected to high temperatures, a compressed air tank connected by a pipe containing a valve with said retort for providing the necessary external pressure against the caps on said tumblers, an auxiliary tank within the retort containing a fluid and representative of the pressure conditions within the tumblers, opposing diaphragms respectively exposed to the pressure within said auxiliary tank and the pressure in said retort, a reciprocatory rod engaged at its ends by and operated from said diaphragms, a frame in whose end portions said diaphragms are held, a supporting switch-bar mounted on said frame, a pivoted lever supported by said bar and engaged at one side of its pivot by said rod to be operated in both directions therefrom, pivoted links articulated with the ends of said lever, pivoted switch arms connected by springs with and insulated from said links, a blow-off valve connected with said retort, electro-magnets for opening said valves and electric circuits including said magnets and adapted to be respectively made and broken at said switch arms, said diaphragms, rod and lever being moved in one direction by the pressure in said auxiliary tank to close one switch and complete the circuit to open said compressed air valve to admit pressure to the retort in excess of the pressure generated in the tumblers, and in the other direction to open said one switch and close the other switch by an undue excess of pressure in the retort and complete the circuit for opening said blow-off valve.

3. In apparatus of the character described comprising a main tank or retort within which products contained in capped tumblers and the like are subjected to high temperatures, means for supplying pressure to the retort to act externally against the caps on the tumblers, an auxiliary tank exposed to the heat of the retort and containing a fluid expansible by said heat and representative of the pressure conditions within the tumblers and means governed by the pressure within said auxiliary tank for admitting pressure to the retort in excess of the pressure generated within the tumblers, said auxiliary tank for regulating the counter-pressure being independent of the treated receptacles as regards its volume and contents and adapted to ensure a preponderance of pressure within the retort for preventing the caps from being blown off.

4. In apparatus of the character described comprising a main tank or retort within which products contained in capped tumblers and the like are subjected to high temperatures, means for supplying pressure to the retort to act externally against the caps on the tumblers, an auxiliary tank exposed to the heat of the retort and containing a fluid expansible by said heat and representative of the pressure conditions within the tumblers, means governed by the pressure within said auxiliary tank for admitting pressure to the retort in excess of the pressure generated within the receptacles and means operable by the pressure within the retort for cutting off the pressure-supply therefrom when the requisite predominating pressure is attained within the retort, said auxiliary tank for regulating the counter-pressure being independent of the treated receptacle as regards its volume and contents and adapted to ensure a preponderance of pressure within the retort for preventing the caps from being blown off.

5. In apparatus of the character described comprising a main tank or retort within which products contained in capped tumblers and the like are subjected to high temperatures, means for supplying pressure to the retort to act externally against the caps on the tumblers, an auxiliary tank exposed to the heat of the retort and containing a fluid expansible by said heat and representative of the pressure conditions within the tumblers, means governed by the pressure within said auxiliary tank for admitting pressure to the retort in excess of the pressure generated within the receptacles, means operable by pressure within the retort for cutting off the pressure-supply therefrom when the requisite predominating pressure is attained within the retort, and means operable by an undue excess of pressure in the retort for relieving the retort thereof, said auxiliary tank for regulating the counter-pressure being independent of the treated receptacles as regards its volume and contents and adapted to ensure a preponderance of pressure within the retort for preventing the caps from being blown off.

6. Apparatus as claimed in claim 3, in which the auxiliary tank has means for supplying fluid thereto in regulatable quantity in accordance with the desired preponderance of pressure to be maintained in the retort.

7. Apparatus as claimed in claim 3, comprising a pressure gage indicating the pressure within the retort, and a pressure gage indicating the pressure within the auxiliary tank.

8. Apparatus as claimed in claim 4, in which the control for the pressure in the retort comprises diaphragms respectively exposed to the pressure in the auxiliary tank and the pressure in the retort and means operable from said diaphragms which control the admission of pressure to, and its venting from, the retort as required by the treatment being conducted therein.

Signed at Wheeling, in the county of Ohio and State of West Virginia, this 20th day of February, A. D. 1923.

HARRY INGRAM.